United States Patent [19]

Menon et al.

[11] Patent Number: 4,978,550

[45] Date of Patent: Dec. 18, 1990

[54] REVERSE OSMOSIS WATER PURIFICATION SYSTEM FOR PRODUCING CARBONATED WATER

[75] Inventors: Krishna S. Menon, Liverpool; Rodger W. Beck, Cortland, both of N.Y.

[73] Assignee: Eastman Kodak Company, Rochester, N.Y.

[21] Appl. No.: 504,379

[22] Filed: Apr. 3, 1990

[51] Int. Cl.$^5$ .................... A21D 10/00; A21D 13/00
[52] U.S. Cl. .................... 426/549; 99/323.2; 210/652; 210/663; 210/257.2; 210/266; 426/590; 426/477
[58] Field of Search ............... 210/634, 640, 663, 644, 210/266, 649–652, 195.2, 257.2, 321.6, 321.65, 321.72; 426/67, 330.3, 330.4, 330.5, 416, 477, 590; 99/323.2; 222/129.4, 189

[56] References Cited

U.S. PATENT DOCUMENTS

| | | |
|---|---|---|
| 2,328,110 | 8/1943 | Thompson . |
| 3,731,845 | 5/1973 | Booth . |
| 3,809,292 | 5/1974 | Booth . |
| 4,304,736 | 12/1981 | McMillin . |
| 4,629,589 | 12/1986 | Gupta . |
| 4,660,741 | 4/1987 | Kirschner . |
| 4,679,707 | 7/1987 | Sedam . |
| 4,688,701 | 8/1987 | Sedam . |
| 4,703,870 | 11/1987 | Sedam . |
| 4,708,266 | 11/1987 | Rudick . |
| 4,753,370 | 7/1988 | Rudick . |
| 4,761,295 | 8/1988 | Casey . |
| 4,781,309 | 11/1988 | Vogel . |
| 4,836,414 | 6/1989 | Credle . |
| 4,879,041 | 11/1989 | Kurokawa . |
| 4,882,177 | 11/1989 | Dziondzik . |

*Primary Examiner*—Frank Sever
*Attorney, Agent, or Firm*—Martin Lukacher

[57] ABSTRACT

A reverse osmosis water purification system produces product water in response to pressurized feed water from a water supply line. The unit also produces waste or drain water. The purified product water is supplied to a reservoir wherein the pressure of the water increases when the reservoir becomes filled or when waste water is used to pressurized the product water and enable it to be withdrawn at a tap or faucet. The product water is carbonated within the product water reservoir with pressurized carbon dioxide gas supplied to the reservoir at a pressure sufficient for the gas to dissolve in the product water via a valve responsive to the pressure of the product water in the reservoir which is normally closed and opens only when the product water is under pressure sufficient to dissolve the gas; this pressure occurring when the reservoir is full in accordance with one embodiment of the invention or when the reservoir pressure is increased when a regulating valve supplies pressurized waste water from the reverse osmosis unit to the reservoir to pressurize the product water therein, in accordance with another embodiment of the invention.

22 Claims, 2 Drawing Sheets

REVERSE OSMOSIS WATER PURIFICATION SYSTEM FOR PRODUCING CARBONATED WATER

DESCRIPTION

The present invention relates to reverse osmosis water purification systems and particularly to reverse osmosis water purification systems (methods and apparatus) wherein the purified water is carbonated.

The invention is especially suitable for use in a reverse osmosis water purification system wherein pressurized water from a water supply line, such as the municipal water mains carried by a water feed line into a dwelling, is purified by means of a reverse osmosis unit which provides purified water as product water therefrom. The purified water is collected in a tank or reservoir which is closed and maintained under pressure by an accumulator, such as provided by dividing the tank into relatively expandable and contractable chambers with a bladder or other flexible diaphragm which separates the tank into two chambers. The invention enables the product water to be pressurized in situ in the product water chamber. The carbonated product water may be tapped from the chamber by a faucet as and when desired.

Reverse osmosis water purification apparatus having a reverse osmosis filtration unit which receives water from a feed water shut off valve and separates it into product water and waste water, and also having a reservoir with a bladder dividing it into a product water chamber for collecting the product water and a control or squeeze water chamber for pressurizing the product water and driving it from the product water chamber when a faucet or tap is open, is commercially available from Fastek, a Kodak company of Liverpool, New York, U.S.A. Such systems may utilize a TRIPAK (tm) reverse osmosis filtration unit having coaxial and concentric reverse osmosis membrane, prefilter and post filter sections (also available from Fastek) which provides product water and waste water at outlets thereof. Such TRIPAK filter units are the subject matter of U.S. Patent application Ser. No. 208,817 filed June 16, 1988 in the name of B. M. Brown et al and assigned to the same assignee as the present application. The Fastek purification system also has a regulator valve connected to the waste water outlet of the filtration unit and the squeeze or control water chamber of the reservoir and to a drain line. The regulator valve provides waste water from the filtration unit to the squeeze water chamber of the reservoir for urging the bladder towards the product water chamber. The regulator valve also enables waste water to be drained from the squeeze water chamber of the reservoir and rapidly reduce the pressure therein, thus facilitating the refilling of the product water chamber when product water is not being withdrawn therefrom. The foregoing Fastek reverse osmosis water purification apparatus is described in U.S. Pat. application Ser. No. 195,560, filed May 18, 1988 in the name of Brown, et al and assigned to the same assignee as the present application (now U.S. Pat. No. 4,909,934, issued March 20, 1990).

It is a feature of the present invention to enable the product water in the product water chamber of the reservoir of the Fastek reverse osmosis water purification system, or any other reverse osmosis water purification system in which product water is collected in a reservoir or tank under pressure, to be carbonated without substantial modification or change to the system.

In order for water to be carbonated, carbon dioxide gas must be passed therethrough while the water is under sufficient pressure for the gas to be dissolved therein. Merely passing compressed carbon dioxide through water at atmospheric pressure will not carbonate the water. Accordingly, in carbonation systems which have heretofore been provided separate tanks and mixing chambers in which carbonation of the water is carried out have been used. A reverse osmosis purification system in which a separate carbonation tank is used is mentioned in U.S. Pat. No. 4,761,295 issued Aug. 2, 1988. The problem remains therefore, to enable carbonation of the water to be carried out without separate carbonation tanks, in the collection reservoir or tank of the reverse osmosis purification system, and without interfering with the operation of the system. It is also desirable to provide a reverse osmosis system wherein carbonation of the product water may be carried out without the need for separate pumps and extensive plumbing thereby not appreciably increasing the cost of manufacture of the system.

Accordingly, it is the principal object of the present invention to provide an improved reverse osmosis water purification system (method and apparatus) wherein product water may be carbonated and whereby the foregoing features may be obtained and the foregoing problems substantially obviated.

Briefly described is a reverse osmosis water purification system for carbonating product water in accordance with the invention using a reverse osmosis filter unit to which water is fed for purification. The unit has outlets for drain (waste) water and product water. The system has a sealed reservoir for collecting the product water under pressurization. Means are provided for sensing the magnitude of pressurization of the product water in the reservoir. The water is carbonated by introducing pressurized carbon dioxide gas into the product water in the reservoir when the pressurization thereof reaches a certain magnitude for the gas to dissolve in the water. A control valve responsive to the pressure presented by the product water is normally closed and opens when the pressure of the product water reaches the certain magnitude. Then the gas is introduced from a source of pressurized carbon dioxide to further pressurize the product water, in the reservoir to dissolve the gas.

The invention has two embodiments in which carbonation occurs at high pressure and at low pressure, respectively. In the high pressure carbonation embodiment, the carbon dioxide gas is introduced when the product water reservoir is full. In the low pressure embodiment, the waste water is used as squeeze water to drive the product water from the reservoir when the product water is withdrawn, say at a faucet or tap. Then pressurized carbon dioxide gas is supplied to the reservoir at lower pressure than in the high pressure case.

The foregoing and other embodiments and features of the invention will become more readily apparent from a reading of the following description in connection with the accompanying drawings in which.

Figure 1:
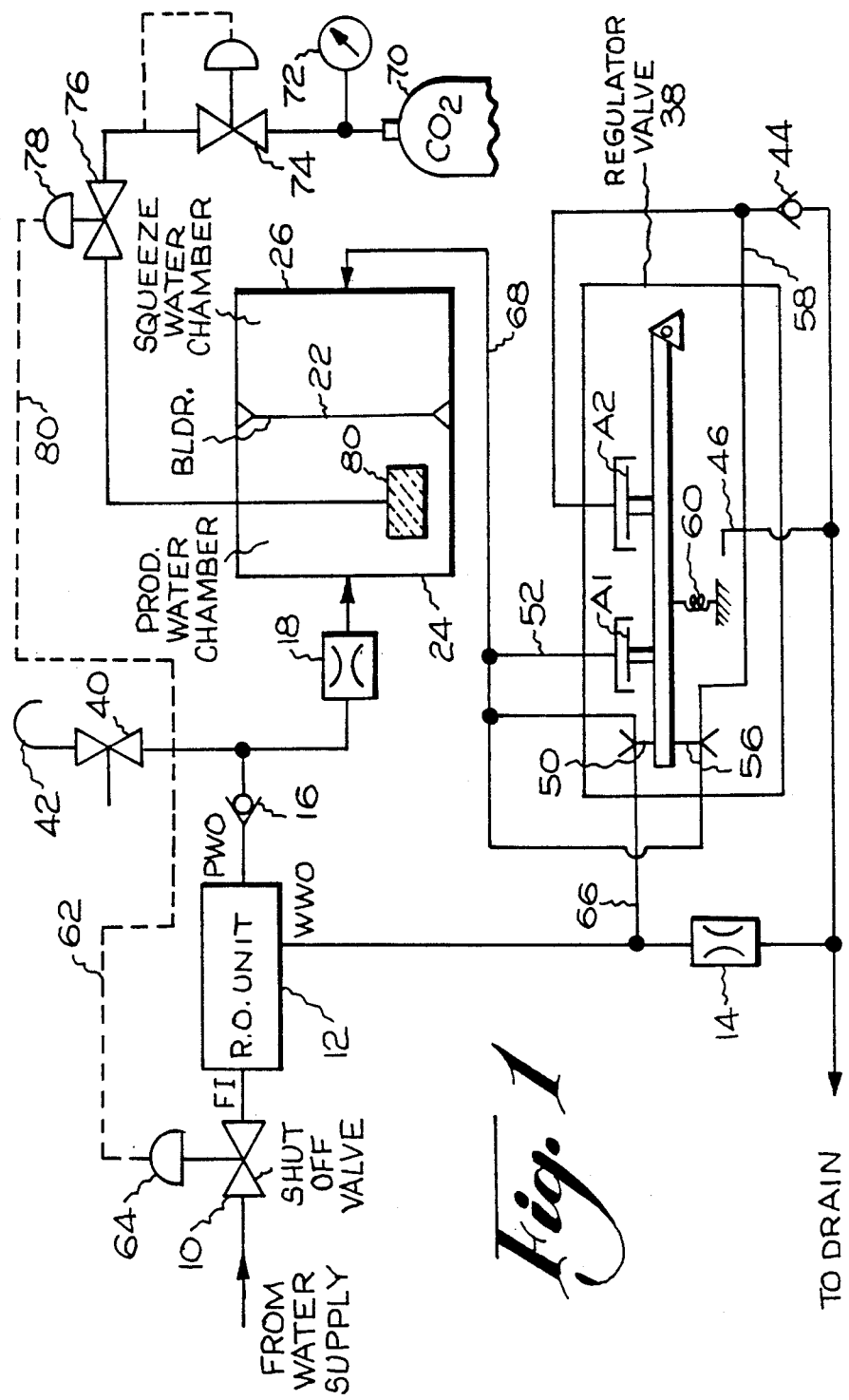
FIG. 1 is a schematic diagram of a reverse osmosis water purification system wherein waste water is utilized to develop pressure for driving product water from a product water chamber of a reservoir, similar to the Fastek system described in the above identified U.S. patent application Ser. No. 195,560 and wherein the product water in the product water chamber is carbonated.

In the drawings piping carrying water is shown in full lines and control lines are shown as dashed lines.

Figure 2:
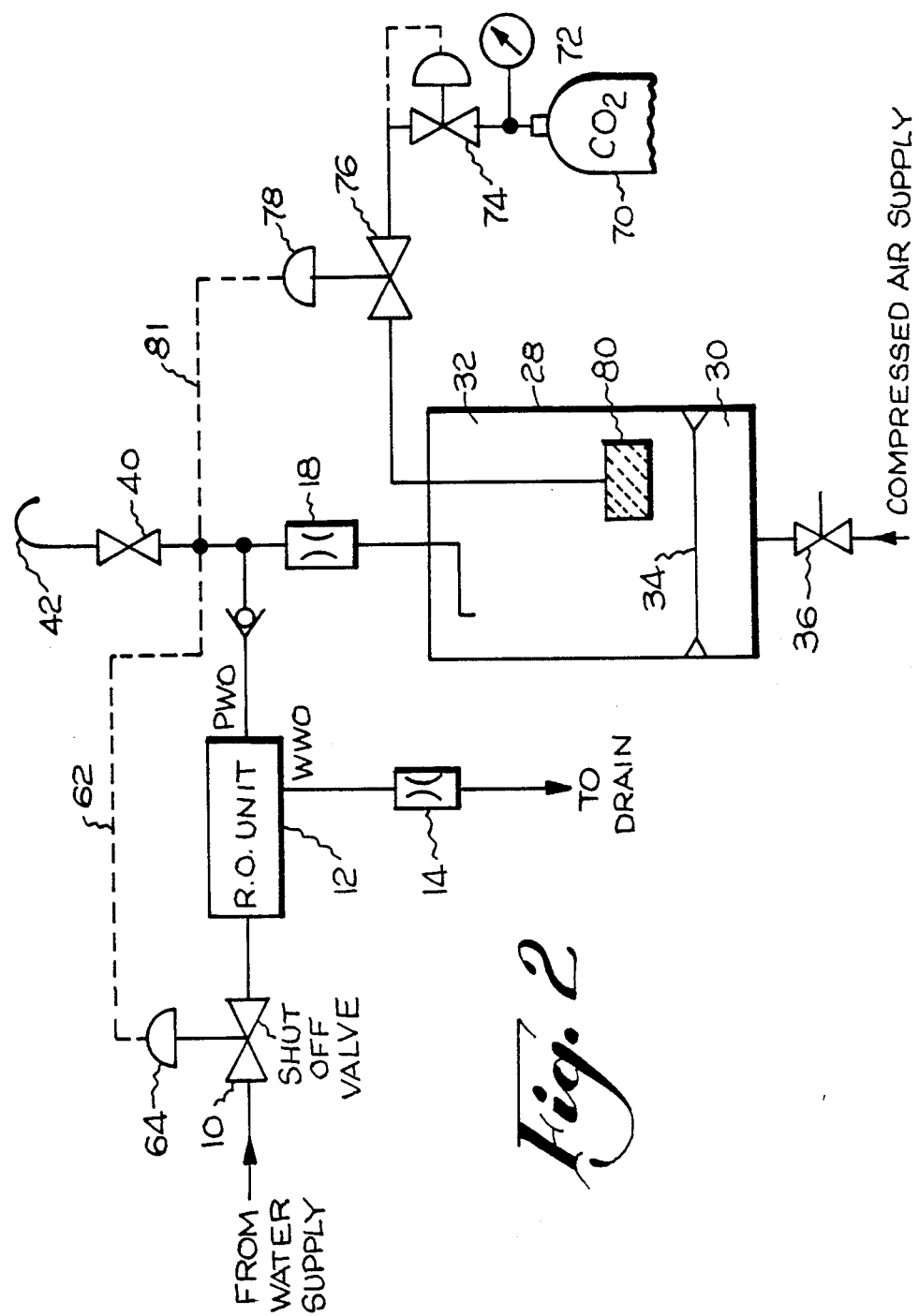
FIG. 2 is a schematic diagram of a reverse osmosis water purification system in accordance with another embodiment of the invention.

In both FIG. 1 and FIG. 2 water from the water supply (the mains or feed line) is delivered via a shut off valve 10 to a reverse osmosis filter unit 12. This unit has a reverse osmosis membrane filter and may have pre and post filters in series with the membrane filter. The RO Unit 12 is preferably a TRIPAK filter unit, but may be of a reverse osmosis filter of another design. The filter unit 12 has a feed water input FI a product water outlet PWO and a waste or drainwater outlet WWO. The product water is pressurized by the water supply which in a typical municipal system may range from 40 to 100 PSIG. The product water is then produced at 5 to 8 PSIG back pressure. The waste water is then at relatively high pressure which is reduced to control the waste water flow to drain (usually the sewer) by a restrictor 14. The product water is fed via a check valve 16 through another restrictor 18 to a product water reservoir. The product water reservoir 20 in FIG. 1 is of the type wherein an accumulator chamber is provided by a flexible bladder or diaphragm 22 which divides the reservoir into a product water chamber 24 and a control or squeeze water chamber 26. The reservoir 28 in FIG. 2 is a so-called captive air reservoir having an accumulator chamber 30 and a product water chamber 32 separated by a flexible diaphragm or bladder 34. The accumulator chamber 32 is supplied with compressed air from a compressed air supply through a shut off valve 36. Both the reservoirs 20 and 28 thus have relatively expandable and contractable chambers. The product water in both cases is supplied to fill the product water chambers 24 and 28.

In the case of the system shown in FIG. 1, a regulator valve 38 provides the waste water to the squeeze water chamber 26, when product water is demanded (withdrawn) from the product water chamber 24 via a valve 40 of a faucet or tap 42. The regulating valve 38 also enables the squeeze water to drain from the squeeze water chamber and presents a low pressure therein to enable the product water to collect and fill the product water chamber 24. A relief valve 44 connects the regulator valve to drain in parallel with another drain connection 46 from the regulator valve 38. Except for the restrictor 18 which partially restricts and reduces the pressure of the product water flowing through the tap 42, the purification system so far described are conventional; the system shown in FIG. 1 being described in the above-referenced U.S. Patent application Ser. No. 195,560.

The regulator valve 38 senses the direction in the flow of the pressurizing waste water into and out of the squeeze water chamber 26, and automatically adjusts the pressure of this water to a higher pressure for product water delivery at the tap 42 or to a lower back pressure when the product water is being produced and is filled the product water chamber 24.

The regulator valve has an interior valve cavity beneath a diaphragm 48 which is open to drain through the line 46, and is therefore always at atmospheric pressure. Wastewater from WWO communicates with a central diaphragm area A1 through an inlet poppet valve 50. The regulator valve 38 has an outlet which communicates directly with the area A1 of the diaphram 34 via a line 52. This line is also in communication with an annular area A2 of the diaphragm by way of a line 54 and an outlet poppet valve 56 and a line 58 and one or more openings in the diaphragm 48. The poppet valve 50 has a valve stem directed towards the top of the diaphragm 48. The poppet valve 56 has a valve stem directed towards the bottom of the diaphragm 48. The poppet valve 50 is held open by the diaphragm spring 60 and the diaphragm pushing on its stem. The lower poppet valve 56 is held closed by its own spring, not shown.

The principal flow paths of water through the system are as follows: feedwater enters the system through the shut off valve 10 and flows into the filtration unit 12 which separates the feed water as product water and waste water. The product water flows from PWO through the check valve 16 through a control line 62 to the controller 64 of the shut off valve 10. Product water also flows to the product water chamber 24 and, when demanded, to the tap 42. Wastewater flows from WWO through the restrictor 14 to drain and also to the regulating valve via a line 66.

When product water is withdrawn via the tap (the faucet valve 40 having been opened), waste water is supplied, as squeeze water, through the inlet poppet 50 by virtue of the diaphram area A1 sensing the pressure in line 52. The pressure feeding the squeeze water chamber 26 is maintained at about 20 to 25 PSIG by the force balance between the pressure on the smaller diaphram area A1 and the spring 60. When withdrawal of product water is discontinued and product water begins to fill the product water chamber 24, excess squeeze water in the chamber 26 is carried by line 68 and line 54 into the valve 30 where it applies pressure against area A1. The waste water pressure increases to maintain a force balance with the spring 60. When the pressure of the waste water in the chamber 26 reaches about 25 PSIG, the balance of forces is sufficient to open the outlet poppet 56 and a rapid downshift of pressure to from 20 to 25 PSIG to about 5 to 8 PSIG occurs, because the squeeze water chamber 26 is in communication with the relief valve 44 and the area A2 while still acting on the smaller area A1. Then the force balance is strongly in the downward direction and moves the outlet poppet 56 to full open position. The relief valve 44 in the drain line maintains a high enough back pressure (from about 5 to 8 PSIG) on the areas A1 and A2 to hold the outlet poppet 56 open. Thus, the valve 38 provides an "upshift" in pressure on the product water in the chamber 24 when the faucet 40 is open to withdraw water from the chamber and a "downshift" of pressure on the product water in the chamber 24 to from about 5 to 8PSIG when the faucet 40 is closed. This shift in Pressure is utilized in the carbonation system in accordance with the low pressure embodiment of the invention to enable water to be carbonated while the upshifted or higher squeeze water pressure is being applied to the product water in the chamber 24. In other words, upon shifting from withdrawal pressure of 20-25 psi to fill pressure 5-8 psi is termed downshift. This occurs as follows:

When faucet is shut, pressure rises in the product reservoir due to (i) wastewater pressure, (ii) product water filling the reservoir. The valve (38) may operate such that when this pressure reaches 25 PSIG; valve 38 switches the mode of operation from withdrawal pressure to fill pressure.

In order to carbonate the product water in the product water chamber 32 of tank 28 or 24 of tank 20 a cylinder of pressurized carbon dioxide ($CO_2$) 70 is provided. The pressure in the cylinder may be monitored by a gauge 72. The delivery pressure of $CO_2$ is regulated by a regulator valve 74. The $CO_2$ gas is delivered by a control valve 76, with a pressure sensing controller 78, which senses the pressure of the product water in the chamber 24 or the chamber 32. The pressurized gas is delivered into the water in the chambers 24 or 32, preferably through a diffuser 80. A spray nozzle may also be used.

High pressure carbonation may be obtained by setting the regulator valve 74 so that $CO_2$ gas is delivered at about 120 PSIG (from 90–120 PSIG, preferably at 120 PSIG). The control valve 76 is normally closed. It may for example be set to open when the product water pressurization exceeds 30 PSIG. The valve 76 is set to close, for example when the product water pressure drops to 25 PSIG. The shut off valve may be set to close when the product water pressure is at 35 PSIG and thereafter to reopen when the product water pressure drops to 10 PSIG. The regulator valve system 38 can be set to supply drive water pressure via the squeeze water chamber 26 at from 20 to 25 PSIG and drain the drive water from the chamber 26 at 5 to 8 PSIG.

With the shut off valve open, the RO Unit 12 delivers product water at from 5 to 8 PSIG back pressure (the feed pressure from the water supply being from 40 to 100 PSIG). The product water chambers 24 (FIG. 1) or 32 (FIG. 2) then fill. When the product water chamber (24 or 32) is substantially full, the pressurization of the water therein increases. This is because the accumulator chamber contracts to its minimum size as the dictated by the dimensions thereof and the product water is incompressible. The product water pressure is sensed by the controller 78 via the control line 81. When this pressure reaches 30 PSIG, the control valve 76 opens and $CO_2$ gas is introduced into the product water chambers 24 or 32. Since the product water is pressurized, it will accept $CO_2$ and $CO_2$ will dissolve therein. Further rise in the pure water pressure as additional product water fills the chamber and due to the pressure of carbonation, causes the shut off valve 10 to close (i.e., when the pressure in the chamber reaches 35 PSIG). Carbonation continues further, until valve 76 is closed, which happens when product pressure drops below 25 psi as and when faucet is open. When water is withdrawn by opening the faucet valve 40, the pressure sensed by the shut off valve control 64 via the line 62 drops off. When this pressure drops to 10 PSIG the shut off valve opens and product water production resumes.

In the low pressure embodiment, the regulator valve 74 may be set to provide $CO_2$ at about 30 PSIG. The control valve 76 may be set to open at 15 PSIG and close at 10 PSIG. Then carbonation occurs not only when the product water chamber 24 is full, but also every time that the regulator valve 38 goes into its upshift mode for product water delivery. Then the product water chamber is sufficiently pressurized when pressurized $CO_2$ is introduced therein via the control valve 76 and dissolves in the product water. The shut off valve 10 may be set to shut off at or below 20 PSIG.

The attached pressure charts show typical pressure for high and low pressure carbonation in the FIG. 1 embodiment.

| Pressure Charts: High Pressure Carbonation (all Pressures (pr) in PSIG) | |
| --- | --- |
| Fill pr = | 5–8 |
| Shut off = | 30–35 |
| Start up = | 10 |
| Withdrawal = | 20 (or upshifted pressure) |
| Downshift Carbonation = | 25 |
| Valve (76) = | 30 open |
| | 25 shut |

| Low Pressure Carbonation: | |
| --- | --- |
| Fill = | 5–8 |
| Shut off = | 20 |
| Start up = | 10 |
| Withdrawal = | 15–20 |
| Downshift Carbonation = | 35 |
| Valve (76) = | 15 open |
| | 10 shut |

Note: While withdrawal of product water occurs, carbonation starts, pressure goes to 30, but will not downshift because downshift pr=35. However, shut off valve may shut off, but withdrawal is not affected due to $CO_2$ pressure. When faucet is closed, pressure rises above 35 PSIG resulting in downshift that causes loss of pressure, shutting off of valve 74 ($CO_2$), opening of shut off valve and normal filling cycle.

From the foregoing description it will be apparent that there has been provided an improved reverse osmosis water purification system which produces carbonated product water. Variations and modifications in the herein described systems, within the scope of the invention will undoubtedly suggest themselves to those skilled in the art. Accordingly, the foregoing description should be taken as illustrative and not in a limiting sense.

We claim:

1. The method comprising carbonating product water produced by a reverse osmosis water purification system having a reverse osmosis filter unit to which water is fed for purification therein and also having outlets for drain water and product water and a means for providing an alternative to separate carbonation tanks including sealed reservoir for collecting said product water under pressurization, by sensing the magnitude of pressurization of said product water in said reservoir, and introducing pressurized $CO_2$ gas into said product water when said pressurization reaches a certain magnitude.

2. The method according to claim 1 further comprising extracting the product water from said reservoir at a tap at a pressure lower than the pressure of said product water in said reservoir.

3. The method according to claim 1 wherein said pressurization of said product water is about 30 PSIG and said gas pressure is in the range from about 90 to 120 PSIG.

4. The method according to claim 1 wherein said pressurization is about 15 PSIG and said gas pressurization is about 30 PSIG.

5. The method according to claim 1 further comprises the step of supplying the feed water to said RO unit of said system under pressure.

6. The method according to claim 5 wherein said feed water pressure is water main pressure from about 40–100 PSIG.

7. The method according to claim 5 wherein said product water reservoir is a first of a pair of expandable and contractable chambers in a tank which are separated by a bladder, and further comprising the steps of maintaining a second of said pair of chambers under pressure, supplying product water to said first chamber until the pressurization therein is a pressure magnitude corresponding to said first chamber being full, and commencing said introducing of said gas when said pressure magnitude corresponding to said first chamber being full is sensed.

8. The method according to claim 7 wherein said system has a regulating valve for supplying to and for draining the drain water produced by said RO unit from said second chamber to maintain said pressure therein at a first pressure when product water is withdrawn from said first chamber and a second pressure equal or less than the pressure of said product of water supplied to said first chamber when product water is not being withdrawn therefrom.

9. The method according to claim 5 wherein said product water reservoir is a first of a pair of expandable and contractible chambers in a tank which are separated by a bladder, and wherein said system has a regulating valve for supplying to and for draining the drain water produced by said RO unit from said second chamber to maintain the pressure therein at a first pressure when product water is withdrawn from said first chamber and a second pressure equal or less than the pressure of said product water supplied to said first chamber when product water is not being withdrawn therefrom and said first chamber is being filled, and wherein said step of introducing said gas is commenced when the pressure in said first chamber exceeds said first pressure and is terminated when said pressure in said first chamber reaches or drops below said second pressure.

10. The method according to claim 9 further comprising the step of regulating the pressure of said gas supplied to said product water in said first chamber so that it does not exceed approximately the said first pressure.

11. The method according to claim 10 wherein said pressure at which said feed water is supplied to said system is in a range from about 40–100 PSIG.

12. Apparatus comprising: means for carbonating product water produced by a reverse osmosis water purification system having a reverse osmosis filter unit to which water is fed for purification therein and also having outlets for drain water and product water and a means for providing an alternative to separate carbonation tanks including sealed reservoir for collecting said product water under pressurization, including means for sensing the magnitude of pressurization of said product water in said reservoir, and means for introducing pressurized $CO_2$ gas into said product water in said reservoir when said pressurization reaches a certain magnitude.

13. The apparatus according to claim 12 further comprising a restrictor as between said reservoir and said top which enables extracting the product water from said reservoir at said top at a pressure lower than the pressure of said product water in said reservoir.

14. The apparatus according to claim 12 wherein said pressurization of said product water is about 30 PSIG and said gas pressure is in the range from about 90 to 120 PSIG.

15. The apparatus according to claim 12 wherein said pressurization is about 15 PSIG and said gas pressurization is about 30 PSIG.

16. The apparatus according to claim 12 further comprising means for supplying the feed water to said RO unit of said sYstem under pressure.

17. The apparatus according to claim 16 wherein said supplying means is connected to a water main and said pressure is water main pressure from about 40–100 PSIG.

18. The apparatus according to claim 16 wherein said product water reservoir is a first of a pair of expandable and contractable chambers in a tank which are separated by a bladder, and further comprising means for maintaining a second of said pair of chambers under pressure, means for supplying product water to said first chamber until the pressurization therein is a pressure magnitude corresponding to said first chamber being full, and means for introducing of said gas when said pressure magnitude corresponding to said first chamber being full is sensed.

19. The apparatus according to claim 18 wherein said system has a regulating valve for supplying to and for draining the drain water produced by said RO unit from said second chamber to maintain said pressure therein at a first pressure when product water is withdrawn from said first chamber and a second pressure egual or less than the pressure of said product of water supplied to said first chamber when product water is not being withdrawn therefrom.

20. The apparatus according to claim 16 wherein said product water reservoir is a first of a pair of expandable and contractible chambers in a tank which are separated by a bladder, and wherein said system has a regulating valve for supplying to and for draining the drain water produced by said RO unit from a second of said pair of chambers to maintain the pressure therein at a first pressure when product water is withdrawn from said first chamber and a second pressure equal or less than the pressure of said product water supplied to said first chamber when product water is not being withdrawn therefrom and said first chamber is being filled, and means for first introducing said gas to said first chamber when the pressure in said first chamber exceeds said first pressure and citing off said gas flow to said first chamber when said pressure in said first chamber reaches or drops below said second pressure.

21. The apparatus according to claim 20 further comprising means for regulating the pressure of said gas supplied to said product water in said first chamber so that it does not exceed approximately the said first pressure.

22. The apparatus according to claim 21 wherein said pressure at which said feed water is supplied to said system is in a range from about 40–100 PSIG.

* * * * *